US008625403B2

(12) United States Patent
Sun et al.

(10) Patent No.: US 8,625,403 B2
(45) Date of Patent: *Jan. 7, 2014

(54) METHOD AND APPARATUS FOR RESOURCE MAPPING AND CODE DIVISION MULTIPLEXING

(75) Inventors: Weijun Sun, Kista (SE); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,726

(22) Filed: Sep. 13, 2012

(65) Prior Publication Data

US 2013/0010586 A1    Jan. 10, 2013

Related U.S. Application Data

(63) Continuation of application No. 13/291,697, filed on Nov. 8, 2011, now Pat. No. 8,315,149, which is a continuation of application No. PCT/CN2011/070082, filed on Jan. 7, 2011.

(30) Foreign Application Priority Data

Jan. 8, 2010    (CN) .......................... 2010 1 0002397

(51) Int. Cl.
H04J 9/00    (2006.01)
(52) U.S. Cl.
USPC .......................................... 370/203; 370/342
(58) Field of Classification Search
None
See application file for complete search history.

(56) References Cited

U.S. PATENT DOCUMENTS

| 7,436,758 | B2 | 10/2008 | Suh et al. |
| 8,315,149 | B2 | 11/2012 | Sun et al. |
| 2004/0120303 | A1 | 6/2004 | Kloos et al. |
| 2006/0203794 | A1 | 9/2006 | Sampath et al. |
| 2008/0232493 | A1 | 9/2008 | Zhang et al. |
| 2009/0046570 | A1 | 2/2009 | Sarkar et al. |
| 2011/0090817 | A1 | 4/2011 | Qu et al. |

FOREIGN PATENT DOCUMENTS

| CN | 1719817 A | 1/2006 |
| CN | 1980212 A | 6/2007 |
| CN | 101110805 A | 1/2008 |
| CN | 101237271 A | 8/2008 |
| CN | 101304397 A | 11/2008 |
| CN | 101359952 A | 2/2009 |
| CN | 101389136 A | 3/2009 |
| CN | 101394382 A | 3/2009 |
| CN | 101420734 A | 4/2009 |
| CN | 101616438 A | 12/2009 |

(Continued)

OTHER PUBLICATIONS

CATT, "Further Investigation on DMRS Design for LTE-A" 7.2.1, 3GPP TSG RAN WG1 Meeting #59bis. Valencia, Spain, Jan. 18-22, 2010. R-100021.

(Continued)

Primary Examiner — Kevin C Harper
(74) Attorney, Agent, or Firm — Brinks Gilson & Lione

(57) ABSTRACT

The present disclosure discloses a method and an apparatus for resource mapping and code division multiplexing. In the present disclosure, each cell selects a mapping scheme among at least two mapping schemes to implement resource mapping, which effectively reduces interference imposed on reference signal symbols of users at the edge of a cell; vector switching is performed for an orthogonal matrix to obtain multiple different codeword sequences and implement codeword design.

9 Claims, 4 Drawing Sheets

(56) References Cited

FOREIGN PATENT DOCUMENTS

| CN | 101621805 A | 1/2010 |
|---|---|---|
| CN | 102014475 B | 1/2012 |
| EP | 0631406 A1 | 12/1994 |
| EP | 2139135 A1 | 12/2009 |
| WO | WO 2007/022631 A1 | 3/2007 |

OTHER PUBLICATIONS

LTE, "3rd Generation Partnership Project, Technical Specification Group Radio Access Network, Evolved Universal Terrestrial Radio Access (E-UTRA), Physical Channels and Modulation" Release 10. 3GPP TS 36.211, V10.0.0, Dec. 2010.

International Search Report issued in corresponding PCT Patent Application No. PCT/CN2011/070082, mailed Apr. 21, 2011.

Written Opinion of the International Searching Authority issued in corresponding PCT Patent Application No. PCT/CN2011/070082, mailed Apr. 21, 2011.

Extended European Search Report issued in corresponding European Patent Application No. 11731682.8, mailed Mar. 6, 2012.

Minn et al., "PAR-Constrained Training Signal Designs for MIMO OFDM Channel Estimation in the Presence of Frequency Offsets" IEEE Transactions on Wireless Communications, vol. 7, No. 8, Aug. 2008.

NTT DoCoMo, "Orthogonal Pilot Channel Structure in E-UTRA Downlink" Agenda Item 5.1.2.2. 3GPP TSG-RAN WG1 LTE Ad Hoc Meeting, Helsinki, Finland. Jan. 23-25, 2006. R1-060031.

Office Action issued in commonly owned U.S. Appl. No. 13/291,697, mailed Jan. 19, 2012.

CATT, "Further Investigation on DMRS Design for LTE-A" Agenda Item 7.3.2, 3GPP TSG RAN WG1 Meeting #59. Jeju, Korea, Nov. 9-13, 2009. R1-094548.

Office Action issued in commonly owned U.S. Appl. No. 13/729,729, mailed Apr. 17, 2013.

METHOD AND APPARATUS FOR RESOURCE MAPPING AND CODE DIVISION MULTIPLEXING

CROSS-REFERENCE TO RELATED APPLICATIONS

This application is a continuation of U.S. patent application Ser. No. 13/291,697, filed on Nov. 8, 2011, which is a continuation of International Application No. PCT/CN2011/070082, filed on Jan. 7, 2011, which claims priority to Chinese Patent Application No. 201010002397.X, filed on Jan. 8, 2010, both of which are hereby incorporated by reference in their entireties.

FIELD

The present disclosure relates to the communication field, and in particular, to a method and an apparatus for resource mapping and code division multiplexing.

BACKGROUND

In an LTE (Long Term Evolution, long term evolution) technology, a transmitter provides a reference signal symbol for a receiver, and user equipment of the receiver may obtain, according to the received reference signal symbol, a channel estimation value required for demodulating user data reference signal. Resource mapping needs to be performed to ensure transmission of reference signal symbols and determine a mapping relation between the number of a space layer for transmitting a reference signal symbol, a sub-carrier where the reference signal symbol is located, and a codeword used by the reference signal symbol. Multiple design schemes are designed for the codeword in resource mapping.

In the prior art, when resource mapping is implemented, each cell employs the same mapping scheme. In the prior art, when code division multiplexing is performed, the same codeword sequence is adopted on sub-carriers where each reference signal symbol is located.

For resource mapping, because each cell employs the same mapping scheme, reference signal symbols of users on the edge of a cell are strongly interfered; and when a codeword is designed, because the same codeword is adopted on sub-carriers where each reference signal symbol is located, a problem that the output power of the reference signal symbols is unbalanced occurs.

SUMMARY OF THE DISCLOSURE

The embodiments of the present disclosure provide a method and an apparatus for resource mapping and code division multiplexing to reduce interference on reference signal symbols of users at the edge of a cell and alleviate a problem that the output power of the reference signal symbols is unbalanced. The technical solution is as follows:

In an aspect, a resource mapping method is provided, and the method includes:

selecting a mapping scheme among at least two preset mapping schemes, so that a reference signal symbol that has the strongest transmit power and corresponds to the selected mapping scheme is staggered with a reference signal symbol that has the strongest transmit power and corresponds to a mapping scheme selected by at least one neighboring cell in frequency and/or time; and performing resource mapping according to the selected mapping scheme.

A resource mapping apparatus is further provided, and the apparatus includes:

a storing module, configured to store at least two mapping schemes, where the mapping schemes are mapping relations between the number of a space layer for transmitting a reference signal symbol, a codeword used by the reference signal symbol and a sub-carrier where the reference signal symbol is located;

a selecting module, configured to select a mapping scheme among the at least two mapping schemes stored in the storing module, so that a reference signal symbol that has the strongest transmit power and corresponds to the selected mapping scheme is staggered with a reference signal symbol that has the strongest transmit power and corresponds to a mapping scheme selected by at least one neighboring cell in frequency and/or time; and a mapping module, configured to perform resource mapping according to the mapping scheme selected by the selecting module.

In another aspect, a code division multiplexing method is provided, and the method includes:

performing vector switching for a selected orthogonal matrix to obtain multiple different codeword sequences;

determining mapping relations between the multiple different codeword sequences and each reference signal sub-carrier; and multiplexing, on each reference signal sub-carrier, reference signal symbols of each space layer according to a codeword sequence that is corresponding to each reference signal sub-carrier.

A code division multiplexing apparatus is further provided, and the apparatus includes:

an obtaining module, configured to perform vector switching for a selected orthogonal matrix to obtain multiple different codeword sequences;

a determining module, configured to determine mapping relations between the multiple different codeword sequences obtained by the obtaining module and each reference signal sub-carrier; and a multiplexing module, configured to multiplex, on each reference signal sub-carrier, reference signal symbols of each space layer according to a codeword sequence that is corresponding to each reference signal sub-carrier.

The technical solution provided in the embodiments of the present disclosure brings the following benefits:

Each cell selects a mapping scheme among at least two mapping schemes to implement resource mapping; because a reference signal symbol that has the strongest transmit power and corresponds to the selected mapping scheme is staggered with a reference signal symbol that has the strongest transmit power and corresponds to a mapping scheme selected by at least one neighboring cell in frequency and/or time, interference on reference signals of users at the edge of a cell can be effectively reduced; in addition, vector switching is performed for a selected orthogonal matrix to obtain multiple different codeword sequences, and mapping relations between each reference signal sub-carrier and the multiple different codeword sequences are determined, so that a problem that the output power of the reference signal symbols is unbalanced can be effectively alleviated.

BRIEF DESCRIPTION OF THE DRAWINGS

To describe the technical solutions in the embodiments of the present disclosure clearer, the following briefly describes the accompanying drawings used for the description of the embodiments. Apparently, the accompanying drawings described in the following are merely some embodiments of the present disclosure, and persons of ordinary skill in the art may also derive other drawings from these accompanying drawings without any creative effort.

DETAILED DESCRIPTION OF THE EMBODIMENTS

To make the technical solutions, objectives and merits of the present disclosure clearer, the following describes the embodiments of the present disclosure in further detail with reference to the accompanying drawings.

Embodiment 1

Figure 1:
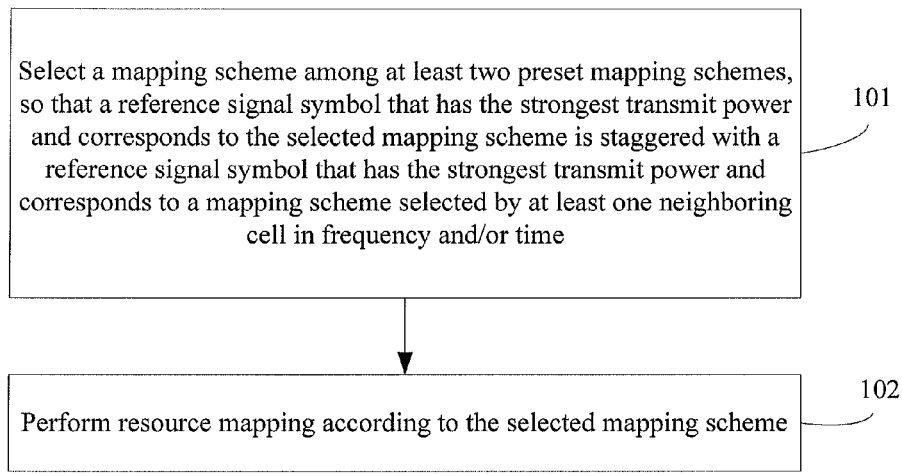
FIG. 1 is a flowchart of a resource mapping method according to a first embodiment of the present disclosure.

As shown in FIG. 1, a resource mapping method provided in this embodiment, and a procedure of the method is as follows:

101. Select a mapping scheme among at least two preset mapping schemes, so that a reference signal symbol that has the strongest transmit power and corresponds to the selected mapping scheme is staggered with a reference signal symbol that has the strongest transmit power and corresponds to a mapping scheme selected by at least one neighboring cell in frequency and/or time.

102. Perform resource mapping according to the selected mapping scheme.

Through the method provided in this embodiment, each cell selects a mapping scheme among at least two preset mapping schemes to implement resource mapping; because a reference signal symbol that has the strongest transmit power and corresponds to the selected mapping scheme is staggered with a reference signal symbol that has the strongest transmit power and corresponds to a mapping scheme selected by at least one neighboring cell in frequency and/or time, interference on reference signal symbols of users at the edge of a cell can be effectively reduced.

Embodiment 2

This embodiment provides a resource mapping method. To facilitate the description, a time-frequency resource block shown in FIG. 2 is taken as an example in this embodiment, and a sub-carrier where a reference signal symbol is located is called "reference signal sub-carrier", so as to describe the resource mapping method provided in this embodiment.

Figure 2:
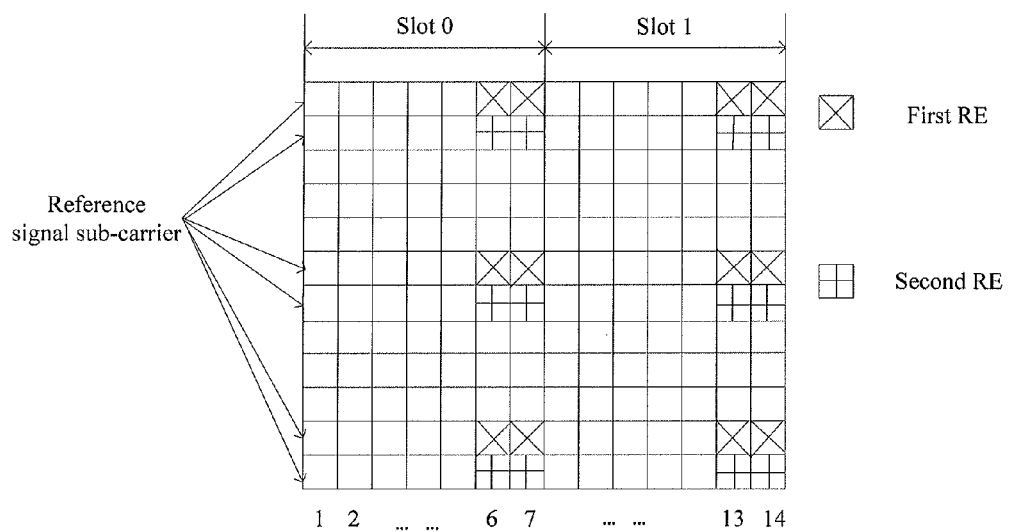
FIG. 2 is a schematic structural diagram of a time-frequency resource block according to a second embodiment of the present disclosure.

In FIG. 2, a subframe includes 2 slots. In each slot, 7 OFDM (Orthogonal Frequency Division Multiplexing, orthogonal frequency division multiplexing) symbols exist; and in each slot, 12×7 REs (Resource Element, resource element) exist in total. A reference signal resource allocation method used by the resource block is: CDM (Code Division Multiplexing, code division multiplexing) is introduced in a time domain to provide 4 orthogonal reference signal resources, for example, a first RE in FIG. 2; and FDM (Frequency Division Multiplexing, frequency division multiplexing) is introduced in a frequency domain to provide 4 orthogonal reference signal resources, for example, a second RE in FIG. 2. For the reference signal resource allocation method shown in FIG. 2, in the prior art, when resource mapping is performed, each cell employs the same mapping scheme, for example, a mapping scheme shown in. Table 1:

TABLE 1

| | Number of space layer | | | | | | | |
|---|---|---|---|---|---|---|---|---|
| | L1 | L2 | L3 | L4 | L5 | L6 | L7 | L8 |
| Codeword of the first RE | C1 | C2 | | | C3 | | C4 | |
| Codeword of the second RE | | | C1 | C2 | | C3 | | C4 |

According to the mapping scheme shown in Table 1, for example, when the total number of transmission layers (RANK) in the space is 3, according to the mapping relations shown in Table 1, two space layers are transmitted on the first RE, and one space layer is transmitted on the second RE. If each space layer has the same transmit power that is ⅓ of the average power of a data RE:

Transmit power of a dedicated reference signal resource on the first RE is (P/3+P/3)*beta=beta*P*⅔; and Transmit power of a dedicated reference signal resource on the second RE is (P/3)*beta=beta*P/3.

Beta represents a power adjustment factor of a reference signal, and P represents average power of the data RE. Under this circumstance, the transmit power of the dedicated reference signal resource on the first RE is double of the transmit power of the dedicated reference signal resource on the second RE.

It should be noted that how to set the power adjustment factor of the reference signal is covered in the prior art, and is not limited in this embodiment. In this embodiment, for description, take an example that the power adjustment factor of the reference signal beta=2 is set when RANK>2, otherwise, beta=1.

Furthermore, for a user at the edge of a cell, because SINR (Signal to Interference plus Noise Ratio, signal to interference plus noise ratio) is lower, a transmission method with a total number of space transmission layers RANK=1 or 2 is generally adopted. If the mapping scheme shown in Table 1 is adopted, this user occupies the resource of the first RE for transmitting a dedicated reference signal.

If both cell 1 and cell 2 select the mapping scheme shown in Table 1, for a user at the edge of cell 1, the transmission method Rank=1 or 2 is generally adopted, and interference power imposed by cell 2 on the reference signal symbol is shown in. Table 2:

TABLE 2

|  | Total number of space transmission layers of cell 2 | | | | | | | |
|---|---|---|---|---|---|---|---|---|
|  | 1 | 2 | 3 | 4 | 5 | 6 | 7 | 8 |
| Interference power from cell 2 | P | P | 4/3 * P | P | 6/5 * P | P | 8/7 * P | P |

In Table 2, P represents average power of the data RE. When RANK>2 in cell 2, the power adjustment factor of the reference signal beta=2 is set; otherwise, beta=1. When the total number of space transmission layers (RANK) is 1, 2, 3, 5, or 7, more space layers are transmitted on the first RE, that is, more power resources are occupied, and greater interference is imposed on corresponding resources of a neighboring cell. In the following analysis, in this embodiment, the reference signal symbol that occupies more power resources and imposes greater interference on the corresponding resources of the neighboring cell is referred to as a reference signal symbol that has the strongest transmit power, and the reference signal sub-carrier where this type of reference signal symbol is located is referred to as a reference signal sub-carrier that has the strongest transmit power.

Figure 3:
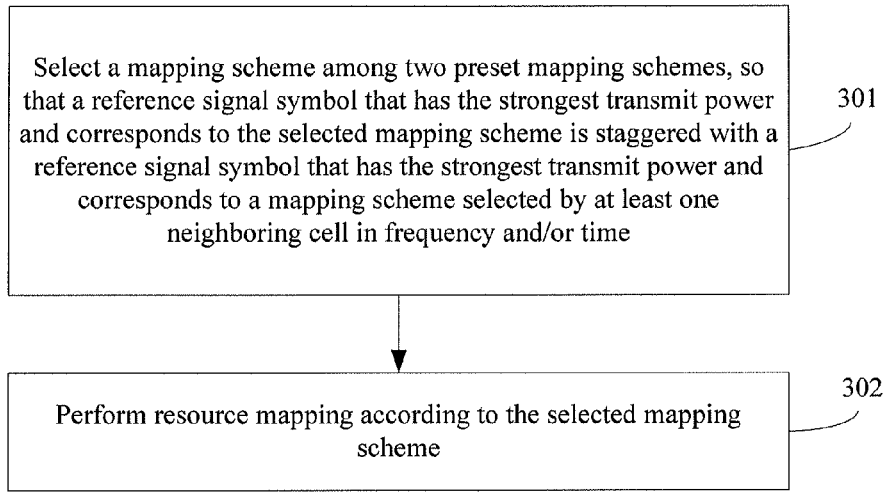
FIG. 3 is a flowchart of a resource mapping method according to the second embodiment of the present disclosure.

A resource mapping method is provided in this embodiment to reduce interference on a reference signal symbol of a user at the edge of a cell. As shown in FIG. 3, supposing that two mapping schemes are preset, a procedure of the method is as follows:

301: Select a mapping scheme among two preset mapping schemes, so that a reference signal symbol that has the strongest transmit power and corresponds to the selected mapping scheme is staggered with a reference signal symbol that has the strongest transmit power and corresponds to a mapping scheme selected by at least one neighboring cell in frequency and/or time.

The mapping schemes are mapping relations between the number of a space layer for transmitting a reference signal symbol, a codeword used by the reference signal symbol and a sub-carrier where the reference signal symbol is located. Still taking the resource block shown in FIG. 2 as an example, mapping scheme A shown in Table 3 and mapping scheme B shown in Table 4 may be set:

TABLE 3

|  | Number of space layer | | | | | | | |
|---|---|---|---|---|---|---|---|---|
|  | L1 | L2 | L3 | L4 | L5 | L6 | L7 | L8 |
| Codeword of the first RE | C1 | C2 |  |  | C3 |  | C4 |  |
| Codeword of the second RE |  |  | C1 | C2 |  | C3 |  | C4 |

TABLE 4

|  | Number of space layer | | | | | | | |
|---|---|---|---|---|---|---|---|---|
|  | L1 | L2 | L3 | L4 | L5 | L6 | L7 | L8 |
| Codeword of the first RE |  |  | C1 | C2 |  | C3 |  | C4 |
| Codeword of the second RE | C1 | C2 |  |  | C3 |  | C4 |  |

For example, when selecting a mapping scheme among two preset mapping schemes, each cell may perform selection according to a Cell ID (cell identifier), for example, If cell ID mod 2=0, mapping scheme A shown in Table 3 is selected; and If cell ID mod 2=1, mapping scheme B shown in Table 4 is selected.

It is assumed that cell 1 selects mapping scheme A, and the neighboring cell 2 selects mapping scheme B.

302: Perform resource mapping according to the selected mapping scheme.

In this step, in the process of reference signal symbol transmission after resource mapping, for a user at the edge of cell 1, a transmission scheme Rank=1 or 2 is generally adopted, and the interference power imposed by cell 2 is shown in Table 5:

TABLE 5

|  | Total number of space transmission layers of cell 2 | | | | | | | |
|---|---|---|---|---|---|---|---|---|
|  | 1 | 2 | 3 | 4 | 5 | 6 | 7 | 8 |
| Interference power from cell 2 (in the prior art) | P | P | 4/3 * P | P | 6/5 * P | P | 8/7 * P | P |
| Interference power from cell 2 (in this embodiment) | P | P | 2/3 * P | P | 4/5 * P | P | 6/7 * P | P |

As shown in Table 5, P represents average power of the data RE. When RANK>2 in cell 2, the power adjustment factor of the reference signal beta=2 is set; otherwise, beta=1. It can be seen from Table 5 that: By adopting the mapping scheme provided in this embodiment, the reference signal interference power imposed by the neighboring cell 2 on the reference signal symbol of the user at the edge of cell 1 may be effectively reduced.

Furthermore, in the resource block shown in FIG. 2, the codeword on the first RE may differ from the codeword on the second RE. That is, the reference signal symbols of frequency division multiplexing employ different codeword sequences. Taking a mapping scheme shown in Table 6 as an example, codeword Cm(m=1-4) may differ from Dm(m=1-4).

TABLE 6

|  | Number of space layer | | | | | | | |
|---|---|---|---|---|---|---|---|---|
|  | L1 | L2 | L3 | L4 | L5 | L6 | L7 | L8 |
| Codeword of the first RE | C1 | C2 |  |  | C3 |  | C4 |  |
| Codeword of the second RE |  |  | D1 | D2 |  | D3 |  | D4 |

It is assumed that the following codewords may be used on the first RE of cell 1:

$$\begin{bmatrix} 1, & 1, & 1, & 1; \\ 1, & -1, & 1, & -1; \\ 1, & 1, & -1, & -1; \\ 1, & -1, & -1, & 1 \end{bmatrix}$$

and, different shifts of the preceding codewords may be used on the second RE, for example, $$\begin{bmatrix} 1, & 1, & 1, & 1; \\ -1, & 1, & -1, & 1; \\ -1, & 1, & 1, & -1; \\ 1, & 1, & -1, & -1 \end{bmatrix}$$

This brings the following benefits: When a cell-specific scrambling code is adopted, if a scrambling code adopted on the first RE is the same as a scrambling code adopted on the second RE, namely, the reference signal symbols of frequency division multiplexing employ the same scrambling code, inter-symbol interference imposed by the neighboring cell on the first RE is different from that imposed on the second RE, in this way, detection performance may be improved.

Furthermore, the reference signal symbols of the neighboring cell may also use different codewords, which is not limited in this embodiment.

Through the method provided in this embodiment, each cell selects a mapping scheme among at least two mapping schemes to implement resource mapping; because a reference signal symbol that has the strongest transmit power and corresponds to the selected mapping scheme is staggered with a reference signal symbol that has the strongest transmit power and corresponds to a mapping scheme selected by at least one neighboring cell in frequency and/or time, interference on the reference signal symbols of users at the edge of a cell may be effectively reduced. In addition, because the method provided in this embodiment also supports that reference signal symbols of frequency division multiplexing or that of time division multiplexing employ the same scrambling code sequence and/or different codeword sequences, inter-symbol interference imposed by the neighboring cell on reference signals differs, so that detection performance may be improved.

Embodiment 3

Figure 4:
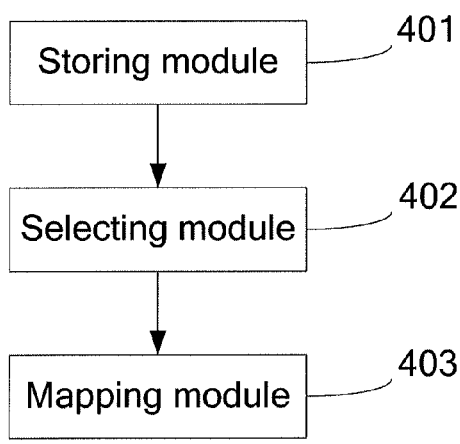
FIG. 4 is a schematic structural diagram of a resource mapping apparatus according to a third embodiment of the present disclosure.

As shown in FIG. 4, a resource mapping apparatus provided in this embodiment, and the apparatus includes:

a storing module 401, configured to store at least two mapping schemes, where the mapping schemes are mapping relations between the number of a space layer for transmitting a reference signal symbol, a codeword used by the reference signal symbol and a sub-carrier where the reference signal symbol is located;

a selecting module 402, configured to select a mapping scheme among the at least two mapping schemes stored in the storing module 401, so that a reference signal symbol that has the strongest transmit power and corresponds to the selected mapping scheme is staggered with a reference signal symbol that has the strongest transmit power and corresponds to a mapping scheme selected by at least one neighboring cell in frequency and/or time; and a mapping module 403, configured to perform resource mapping according to the mapping scheme selected by the selecting module 402.

For example, the selecting module 402 is configured to select a mapping scheme among at least two mapping schemes stored in the storing module 401 according to a cell ID.

Preferably, reference signal symbols of frequency division multiplexing or that of time division multiplexing employ the same scrambling code sequence, and/or employ different codeword sequences.

Through the apparatus provided in this embodiment, each cell selects a mapping scheme among at least two mapping schemes to implement resource mapping; because a reference signal symbol that has the strongest transmit power and corresponds to the selected mapping scheme is staggered with a reference signal symbol that has the strongest transmit power and corresponds to a mapping scheme selected by at least one neighboring cell in frequency and/or time, interference on the reference signal symbols of users at the edge of a cell may be effectively reduced. In addition, because the apparatus provided in this embodiment also supports that reference signal symbols of frequency division multiplexing or that of time division multiplexing employ the same scrambling code sequence and/or different codeword sequences, inter-symbol interference imposed by the neighboring cell on reference signals differs, so that detection performance is improved.

Embodiment 4

Figure 5:
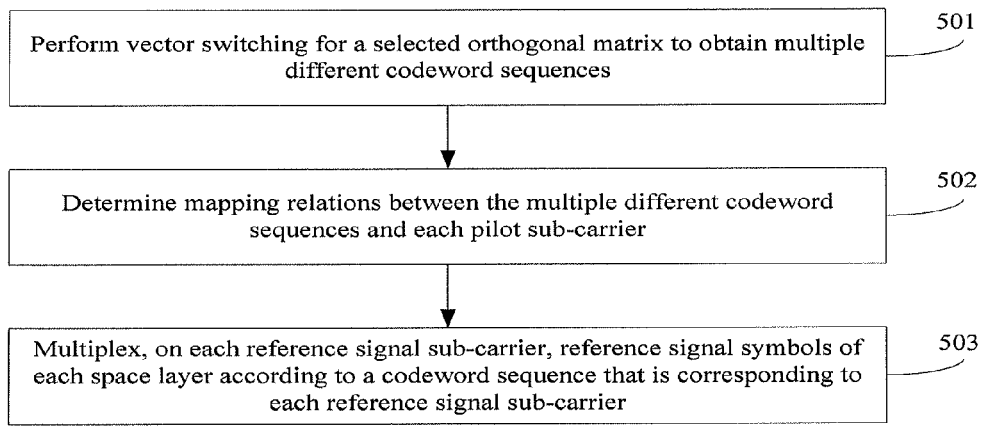
FIG. 5 is a flowchart of a code division multiplexing method according to a fourth embodiment of the present disclosure.

As shown in FIG. 5, a code division multiplexing method provided in this embodiment, and a procedure of the method is as follows:

501: Perform vector switching for a selected orthogonal matrix to obtain multiple different codeword sequences.

502: Determine mapping relations between the multiple different codeword sequences and each reference signal sub-carrier.

503: Multiplex, on each reference signal sub-carrier, reference signal symbols of each space layer according to a codeword sequence that is corresponding to each reference signal sub-carrier.

Through the method provided in this embodiment, vector switching is performed for a selected orthogonal matrix to obtain multiple different codeword sequences, and mapping relations between each reference signal sub-carrier and the multiple different codeword sequences are determined, and therefore, each reference signal sub-carrier employs a different codeword sequence, so that a problem that the output power of the reference signal symbols is unbalanced can be effectively alleviated.

Embodiment 5

This embodiment provides a code division multiplexing method. To facilitate the description, a resource block shown in FIG. 6 is taken as an example in this embodiment to describe the method provided in this embodiment in detail.

Figure 6:
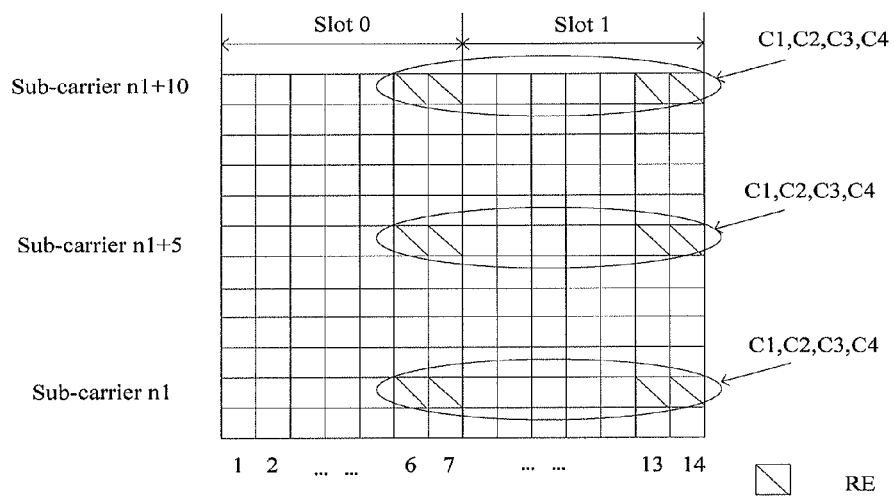
FIG. 6 is a schematic diagram showing code division multiplexing according to a fifth embodiment of the present disclosure.

In FIG. 6, a subframe includes 2 slots (time slot). In each slot, 7 OFDM symbols exist, and 12×7 REs exist in each slot in total. A reference signal resource allocation method adopted by the resource block is: CDM is introduced in a time domain to provide 4 orthogonal reference signal re sources. When a codeword is designed in the prior art, the same CDM codeword (C1-C4) is adopted on sub-carriers n1, n1+5, and n1+10.

Taking a 4×4 Walsh matrix as an example, for example, $$C = \begin{bmatrix} 1, & 1, & 1, & 1; \\ 1, & -1, & 1, & -1; \\ 1, & 1, & -1, & -1; \\ 1, & -1, & -1, & 1 \end{bmatrix}.$$

It is assumed that C1 is the first row of matrix C, namely, C1=C(1,:). Similarly, it is assumed that C2=C(2,:), C3=C(3,:), and C4=C(4,:).

For FIG. 6, in a main analyzing scenario of power imbalance, a broadband space preprocessing vector is considered. That is, for each space layer, the same space preprocessing vector is adopted on each sub-carrier. Supposing that there are 8 transmitting antennas and dedicated reference signal symbols of space layer m are borne and transmitted on a codeword Cm(m=1-4), a reference signal symbol matrix of a transmitter on any reference signal sub-carrier is:

$$\begin{bmatrix} w_{11} \\ w_{21} \\ \vdots \\ w_{81} \end{bmatrix} [c_{11} \ c_{12} \ c_{13} \ c_{14}]s + \ldots + \begin{bmatrix} w_{14} \\ w_{24} \\ \vdots \\ w_{84} \end{bmatrix} [c_{41} \ c_{42} \ c_{43} \ c_{44}]s,$$

where:

$w_{ij}$ is a weighted coefficient of transmission layer j (j=1-4) on transmitting antenna i (i=1-8), s is a reference signal symbol, and $C_{ij}$ is symbol j (j=1-4) of codeword $C_i$ (i=1-4).

It can be seen from the preceding formula that: A reference signal symbol vector on transmitting antenna i (i=1-8) is:

$$[p_{1i} \ p_{2i} \ p_{3i} \ p_{4i}] \begin{pmatrix} w_{i1}[c_{11} \ c_{12} \ c_{13} \ c_{14}] + \\ w_{i2}[c_{21} \ c_{22} \ c_{23} \ c_{24}] + \\ w_{i3}[c_{31} \ c_{32} \ c_{33} \ c_{34}] + \\ w_{i4}[c_{41} \ c_{42} \ c_{43} \ c_{44}] \end{pmatrix} s,$$

where:

Symbol $P_{ki}$, (k=1-4) is transmitted on OFDM symbols 6, 7, 13, and 14 of transmitting antenna i respectively.

With different i and j, it is considered that a space preprocessing vector coefficient $w_{ij}$ is generally different. Combining with the orthogonality of codeword matrix C, that is, for different i and j, C(:,i) is not equal to C(:,j). Therefore, it may be deduced that the reference signal symbol $P_{ki}$, (k=1-4) is generally 4 different values. That is, on any reference signal sub-carrier, the reference signal symbols sent on OFDM symbols 6, 7, 13, and 14 are different.

Furthermore, it is considered that all reference signal sub-carriers employ the same space preprocessing vector and the same reference signal codeword, the sums of power of reference signal RE on each reference signal OFDM symbol respectively are:

$P_6 = \Sigma(|p_{1i}|^2);$ $P_7 = \Sigma(|p_{2i}|^2);$ $P_{13} = \Sigma(|p_{3i}|^2);$ and $P_{14} = \Sigma(|p_{4i}|^2),$ where:

$P_m$ represents a sum of power of all reference signal REs on reference signal OFDM symbol m (here, m=6,7,13,14). It can be known from the preceding analysis, generally, $P_6 \neq P_7 \neq P_{13} \neq P_{14}.$ That is, on each reference signal OFDM symbol, a problem that the output power of reference signals is unbalanced occurs.

Figure 7:
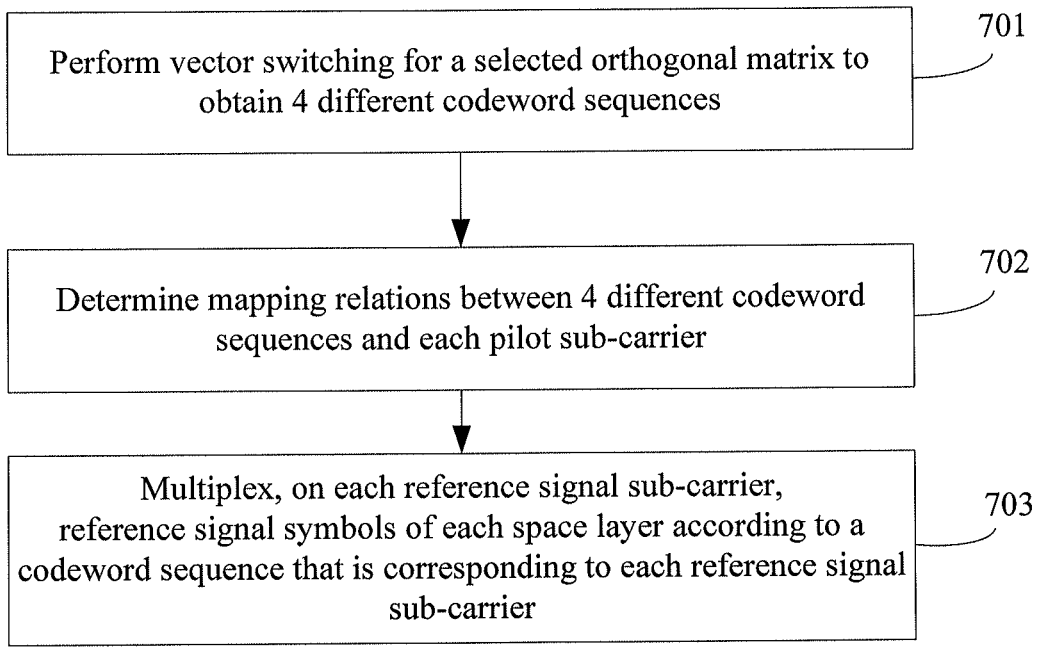
FIG. 7 is a flowchart of a code division multiplexing method according to the fifth embodiment of the present disclosure.

A codeword design method is provided in this embodiment to solve the imbalance problem of the output power of reference signals. As shown in FIG. 7, a procedure of the method provided in this embodiment is as follows:

701: Perform column vector switching for a selected 4-dimensional orthogonal matrix to obtain 4 different codeword sequences.

To facilitate the description, a 4×4 Walsh matrix is taken as an example, for example, $$\text{Orthogonal matrix } W = \begin{bmatrix} 1, & 1, & 1, & 1; \\ 1, & -1, & 1, & -1; \\ 1, & 1, & -1, & -1; \\ 1, & -1, & -1, & 1 \end{bmatrix}.$$

Supposing A=W(:,1), B=W(:,2), C=W(:,3), and D=W(:,4), the column vector switching is performed for the orthogonal matrix W to obtain four derivative matrices of the orthogonal matrix W, which respectively are:

W1=[A, B, C, D];

W2=[B, A, D, C];

W3=[C, D, A, B] or [C, D, B, A];

W4=[D, C, B, A] or [D, C, A, B].

702: Determine mapping relations between 4 different codeword sequences and each reference signal sub-carrier.

For example, according to the 4 different codeword sequences obtained in step 701, the 4 different codeword sequences and each reference signal sub-carrier may adopt the following mapping relations:

for reference signal sub-carrier n1, adopt codeword sequence W1;

for reference signal sub-carrier n2, adopt codeword sequence W2;

for reference signal sub-carrier n3, adopt codeword sequence W3;

for reference signal sub-carrier n4, adopt codeword sequence W4;

for reference signal sub-carrier n5, adopt codeword sequence W1;

for reference signal sub-carrier n6, adopt codeword sequence W2;

and so on.

That is, it is determined that each reference signal sub-carrier adopts 4 different codeword sequences W1, W2, W3, and W4 reference signal by turns.

On reference signal sub-carrier n1, n2, ..., the multiplexing of reference signal symbols of these space layers depends on CDM codes.

703: Multiplex, on each reference signal sub-carrier, reference signal symbols of each space layer according to a codeword sequence that is corresponding to each reference signal sub-carrier.

For the code division multiplexing method provided in this embodiment, a solution to imbalance of the output power of the reference signal symbols is analyzed as follows:

Considering a space broadband preprocessing vector, 8 transmitting antennas are still taken as an example. As shown in FIG. 6, on sub-carrier n1, supposing that dedicated reference signal symbols of space layer m (m=1-4) are borne and transmitted on codeword W1(m,:), a reference signal symbol matrix of a transmitter on the sub-carrier n1 is:

$$\begin{bmatrix} w_{11} \\ w_{21} \\ \vdots \\ w_{81} \end{bmatrix} [W1(1,1) \ W1(1,2) \ W1(1,3) \ W1(1,4)]s +$$

-continued $$\ldots + \begin{bmatrix} w_{14} \\ w_{24} \\ \vdots \\ w_{84} \end{bmatrix} [\, W1(4,1) \quad W1(4,2) \quad W1(4,3) \quad W1(4,4) \,] s,$$

where:

$w_{ij}$ is a weighted coefficient of transmission layer j (j=1-4) on transmitting antenna i (i=1-8), and s is a reference signal symbol.

It can be seen from the preceding formula that: A reference signal symbol vector on transmitting antenna i (i=1-8) is:

$$[\, p_{1i} \quad p_{2i} \quad p_{3i} \quad p_{4i} \,] =$$

$$\begin{pmatrix} w_{i1}[\, W1(1,1) \quad W1(1,2) \quad W1(1,3) \quad W1(1,4) \,] + \\ w_{i2}[\, W1(2,1) \quad W1(2,2) \quad W1(2,3) \quad W1(2,4) \,] + \\ w_{i3}[\, W1(3,1) \quad W1(3,2) \quad W1(3,3) \quad W1(3,4) \,] + \\ w_{i4}[\, W1(4,1) \quad W1(4,2) \quad W1(4,3) \quad W1(4,4) \,] \end{pmatrix} s,$$

where:

Symbol $P_{ki}$, (k=1-4) is transmitted on reference signal OFDM symbols 6, 7, 13, and 14 of transmitting antenna i respectively.

According to a mapping relation between W2 and W1, it may be deduced that on reference signal sub-carrier n2, corresponding reference signal symbol vector on transmitting antenna i (i=1-8) is $[p_{2i}\ p_{1i}\ p_{4i}\ p_{3i}]$. Similarly, it may be deduced that:

On reference signal sub-carrier n3, corresponding reference signal symbol vector on transmitting antenna i (i=1-8) is $[p_{3i}\ p_{4i}\ p_{1i}\ p_{2i}]$; and On reference signal sub-carrier n4, corresponding reference signal symbol vector on transmitting antenna i (i=1-8) is $[p_{4i}\ p_{3i}\ p_{2i}\ p_{1i}]$.

If the number of reference signal sub-carriers is an integer multiple of 4, it may be deduced that: on the corresponding transmitting antenna i (i=1-8), on each reference signal OFDM symbol, namely, on OFDM symbols 6, 7, 13, and 14, the sums of power on all reference signal REs are equal, that is:

$$P_6 = P_7 = P_{13} = P_{14} = \Sigma(|p_{1i}|^2 + |p_{2i}|^2 + |p_{3i}|^2 + |p_{4i}|^2), \text{ where:}$$

$P_m$ represents a sum of power of all reference signal REs on reference signal OFDM symbol m (here, m=6, 7, 13, 14). Under this circumstance, because each reference signal OFDM symbol has equal output power, a problem that the output power of reference signals is unbalanced is solved.

Furthermore, if the number of reference signal sub-carriers is not an integer multiple of 4, on each reference signal OFDM symbol, namely, on OFDM symbols 6, 7, 13, and 14, the sums of power on the reference signal REs are less different, so that the problem that the output power of reference signals is unbalanced is also greatly alleviated.

For example, if the number of reference signal sub-carriers is 5, it may be deduced that: on reference signal OFDM symbols 6, 7, 13, and 14, the sums of power on reference signal REs respectively are:

$$P_6 = (|p_{1i}|^2 + |p_{2i}|^2 + |p_{3i}|^2 + |p_{4i}|^2) + |p_{1i}|^2;$$

$$P_7 = (|p_{1i}|^2 + |p_{2i}|^2 + |p_{3i}|^2 + |p_{4i}|^2) + |p_{2i}|^2;$$

$$P_{13} = (|p_{1i}|^2 + |p_{2i}|^2 + |p_{3i}|^2 + |p_{4i}|^2) + |p_{3i}|^2; \text{ and}$$

$$P_{14} = (|p_{1i}|^2 + |p_{2i}|^2 + |p_{3i}|^2 + |p_{4i}|^2) + |p_{4i}|^2.$$

It can be seen from the preceding formula that: On reference signal OFDM symbols 6, 7, 13, and 14, the sums of power of reference signal REs are different only in one term. Therefore, the problem that the output power of reference signals is unbalanced can be alleviated.

Optionally, in addition that column vector switching is performed for a selected orthogonal matrix to obtain multiple different codeword sequences; row vector switching may also be performed for the selected orthogonal matrix to obtain multiple different codeword sequences. The form of vector switching of an orthogonal matrix is not restricted in this embodiment. Still taking a 4-dimensional orthogonal matrix W as an example, the following describes the performing vector switching for an orthogonal matrix to obtain 4 different codeword sequences. For any 4-dimensional orthogonal matrix W, it is assumed that A'=W'(1,:), B'=W'(2,:), C'=W'(3,:), and D'=W'(4,:).

W'(m,:) (m=1 ... 4) represents a row vector corresponding to row m of the W matrix. Row vector switching is performed for the orthogonal matrix W to obtain four derivative matrices, which respectively are:

$$W_1' = \begin{bmatrix} A' \\ B' \\ C' \\ D' \end{bmatrix}; W_2' = \begin{bmatrix} B' \\ A' \\ D' \\ C' \end{bmatrix}; W_3' = \begin{bmatrix} C' \\ D' \\ A' \\ B' \end{bmatrix} \text{ or } \begin{bmatrix} C' \\ D' \\ B' \\ A' \end{bmatrix};$$

$$W_4' = \begin{bmatrix} D' \\ C' \\ B' \\ A' \end{bmatrix} \text{ or } \begin{bmatrix} D' \\ C' \\ A' \\ B' \end{bmatrix}.$$

Correspondingly, mapping relations between the 4 different codeword sequences and each reference signal sub-carrier are as follows:

codeword sequence W1' is adopted by reference signal sub-carrier n1;

codeword sequence W2' is adopted by reference signal sub-carrier n2;

codeword sequence W3' is adopted by reference signal sub-carrier n3;

codeword sequence W4' is adopted by reference signal sub-carrier n4;

codeword sequence W1' is adopted by reference signal sub-carrier n5;

codeword sequence W2' is adopted by reference signal sub-carrier n6;

and so on.

It is determined that 4 different codeword sequences W1', W2', W3' and W4' are adopted by each reference signal sub-carrier by turns.

Through the method provided in this embodiment, vector switching is performed for a selected orthogonal matrix to obtain multiple different codeword sequences, and mapping relations between each reference signal sub-carrier and the multiple different codeword sequences are determined, and therefore, each reference signal sub-carrier employs a different codeword sequence, so that the problem that the output power of the reference signal symbols is unbalanced can be effectively alleviated.

Embodiment 6

Figure 8:
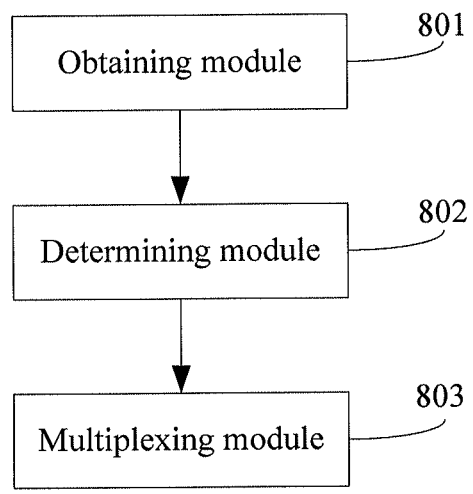
FIG. 8 is a schematic structural diagram of a code division multiplexing apparatus according to a sixth embodiment of the present disclosure.

As shown in FIG. 8, a code division multiplexing apparatus provided in this embodiment, and the apparatus includes:

an obtaining module 801, configured to perform vector switching for a selected orthogonal matrix to obtain multiple different codeword sequences;

a determining module 802, configured to determine mapping relations between the multiple different codeword sequences obtained by the obtaining module and each reference signal sub-carrier; and a multiplexing module 803, configured to multiplex, on each reference signal sub-carrier, reference signal symbols of each space layer according to a codeword sequence that is corresponding to each reference signal sub-carrier.

The obtaining module 801 is configured to obtain 4 different codeword sequences in the following way: for any 4-dimensional orthogonal matrix W, supposing A=W(:,1), B=W(:,2), C=W(:,3), and D=W(:,4), where W(:,m) represents a column vector corresponding to column m of the orthogonal matrix W, and m ranges from 1 to 4, column vector switching for the orthogonal matrix W is performed to obtain 4 different codeword sequences, which respectively are:

W1=[A, B, C, D];
W2=[B, A, D, C];
W3=[C, D, A, B] or [C, D, B, A];
W4=[D, C, B, A] or [D, C, A, B].

Correspondingly, the determining module 802 is configured to:

for reference signal sub-carrier n1, adopt codeword sequence W1;

for reference signal sub-carrier n2, adopt codeword sequence W2;

for reference signal sub-carrier n3, adopt codeword sequence W3;

for reference signal sub-carrier n4, adopt codeword sequence W4;

for reference signal sub-carrier n5, adopt codeword sequence W1;

for reference signal sub-carrier n6, adopt codeword sequence W2;

and so on.

That is, the determining module 802 is configured to determine that 4 different codeword sequences W1, W2, W3, and W4 are adopted by each reference signal sub-carrier by turns.

Optionally, the obtaining module 801 is configured to obtain 4 different codeword sequences in the following way: for any 4-dimensional orthogonal matrix W, supposing A'=W'(1,:), B'=W'(2,:), C'=W'(3,:), and D'=W'(4,:), where W'(m,:) (m=1 . . . 4) represents a row vector corresponding to row m of the orthogonal matrix W, and m ranges from 1 to 4, row vector switching for the orthogonal matrix W is performed to obtain 4 different codeword sequences, which are:

$$W'_1 = \begin{bmatrix} A' \\ B' \\ C' \\ D' \end{bmatrix}; W'_2 = \begin{bmatrix} B' \\ A' \\ D' \\ C' \end{bmatrix}; W'_3 = \begin{bmatrix} C' \\ D' \\ A' \\ B' \end{bmatrix} \text{ or } \begin{bmatrix} C' \\ D' \\ B' \\ A' \end{bmatrix};$$

$$W'_4 = \begin{bmatrix} D' \\ C' \\ B' \\ A' \end{bmatrix} \text{ or } \begin{bmatrix} D' \\ C' \\ A' \\ B' \end{bmatrix}.$$

Correspondingly, the determining module 802 is configured to:

for reference signal sub-carrier n1, adopt codeword sequence W1' reference signal;

for reference signal sub-carrier n2, adopt codeword sequence W2' reference signal;

for reference signal sub-carrier n3, adopt codeword sequence W3' reference signal;

for reference signal sub-carrier n4, adopt codeword sequence W4' reference signal;

for reference signal sub-carrier n5, adopt codeword sequence W1' reference signal;

for reference signal sub-carrier n6, adopt codeword sequence W2' reference signal;

and so on.

That is, the determining module determines that 4 different codeword sequences W1', W2', W3', and W4' are adopted by each reference signal sub-carrier by turns.

In sum, through the apparatus provided in this embodiment, vector switching is performed for a selected orthogonal matrix to obtain multiple different codeword sequences, and mapping relations between each reference signal sub-carrier and the multiple different codeword sequences are determined, and therefore, each reference signal sub-carrier employs a different codeword sequence, so that a problem of power imbalance caused by reference signals can be effectively alleviated.

The serial number of the preceding embodiments is only used for description and does not represent a preference order of the embodiments.

All or part of the steps specified in any embodiment of the present disclosure may be implemented in a hardware processor by using software. The corresponding software programs may be stored in a readable storage media such as CD-ROM or hard disk accessible to the hardware processor.

The preceding descriptions are merely exemplary embodiments of the present disclosure, but are not intended to limit the present disclosure. Any modification, equivalent replacement, or improvement without departing from the spirit and scope of the present disclosure shall all fall within the protection scope of the present disclosure.

What is claimed is:

1. A code division multiplexing method in a wireless telecommunication system, wherein, the method comprises:

determining mapping relations between multiple codeword sequences and multiple reference signal sub-carriers in a resource block; and multiplexing, on each of the reference signal sub-carriers in the resource block, reference signal symbols of each space layer according to the codeword sequence that is corresponding to the reference signal sub-carrier;

wherein the multiple codeword sequences comprise codeword sequence W1, codeword sequence W2, codeword sequence W3 and codeword sequence W4; and W1=[A, B, C, D];
W2=[B, A, D, C];
W3=[C, D, A, B] or [C, D, B, A];
W4=[D, C, B, A] or [D, C, A, B];

wherein A, B, C and D are column vectors.

2. The method according to claim 1, wherein:

the codeword sequences W1, W2, W3, and W4 respectively correspond, by turns, to each reference signal sub-carrier.

3. The method according to claim 1, further comprising:

transmitting the multiplexed reference signal symbols of each space layer.

4. A codeword design apparatus in a wireless telecommunication system, comprising:

a processor, configured to determine mapping relations between multiple codeword sequences and multiple reference signal sub-carriers in a resource block; and multiplex, on each of the reference signal sub-carriers in the resource block, reference signal symbols of each space layer according to the codeword sequence that is corresponding to the reference signal sub-carrier; and a transmitter, configured to transmit the multiplexed reference signal symbols of each space layer;

wherein the multiple codeword sequences comprise codeword sequence W1, codeword sequence W2, codeword sequence W3 and codeword sequence W4; and W1=[A, B, C, D];
W2=[B, A, D, C];
W3=[C, D, A, B] or [C, D, B, A];
W4=[D, C, B, A] or [D, C, A, B];
wherein A, B, C and D are column vectors.

5. The apparatus according to claim 4, wherein:
the codeword sequences W1, W2, W3, and W4 respectively correspond, by turns, to each reference signal sub-carrier.

6. A channel estimation value obtaining method in a wireless telecommunication system, comprising:

receiving, by a user equipment, reference signal symbols of each space layer sent by a transmitter;

obtaining, by the user equipment, a channel estimation value required for demodulating user data according to the reference signal symbols;

wherein the reference signal symbols of each space layer were multiplexed on each of the reference signal sub-carriers in a resource block according to a codeword sequence that is corresponding to the reference signal sub-carrier, the codeword sequence is one of multiple codeword sequences respectively corresponding to multiple reference signal sub-carriers in the resource block;

wherein the multiple codeword sequences comprise codeword sequence W1, codeword sequence W2, codeword sequence W3 and codeword sequence W4; and W1=[A, B, C, D];
W2=[B, A, D, C];
W3=[C, D, A, B] or [C, D, B, A];
W4=[D, C, B, A] or [D, C, A, B];
wherein A, B, C and D are column vectors.

7. The method according to claim 6, wherein the codeword sequences W1, W2, W3, and W4 respectively correspond, by turns, to each reference signal sub-carrier.

8. A user equipment, comprising:
a receiver, configured to receive reference signal symbols of each space layer sent by a transmitter; and a processor, configured to obtain a channel estimation value required for demodulating user data according to the reference signal symbols;

wherein the reference signal symbols of each space layer were multiplexed on each of the reference signal sub-carriers in a resource block according to a codeword sequence that is corresponding to the reference signal sub-carrier, the codeword sequence is one of multiple codeword sequences respectively corresponding to multiple reference signal sub-carriers in the resource block;

wherein the multiple codeword sequences comprise codeword sequence W1, codeword sequence W2, codeword sequence W3 and codeword sequence W4; and W1=[A, B, C, D];
W2=[B, A, D, C];
W3=[C, D, A, B] or [C, D, B, A];
W4=[D, C, B, A] or [D, C, A, B];
wherein A, B, C and D are column vectors.

9. The user equipment according to claim 8, wherein the codeword sequences W1, W2, W3, and W4 respectively correspond, by turns, to each reference signal sub-carrier.

* * * * *